United States Patent
Bae et al.

(10) Patent No.: US 11,407,421 B2
(45) Date of Patent: Aug. 9, 2022

(54) APPARATUS FOR CONTROLLING REVERSE DRIVING OF VEHICLE AND METHOD OF OUTPUTTING WARNING THEREOF

(71) Applicants: Hyundai Motor Company, Seoul (KR); Kia Motors Corporation, Seoul (KR)

(72) Inventors: Sung Ik Bae, Seoul (KR); Ji Hoon Kim, Cheonan-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 133 days.

(21) Appl. No.: 16/654,614

(22) Filed: Oct. 16, 2019

(65) Prior Publication Data

US 2020/0398854 A1    Dec. 24, 2020

(30) Foreign Application Priority Data

Jun. 18, 2019  (KR) .......................... 10-2019-0072163

(51) Int. Cl.
*B60W 40/06*    (2012.01)
*B60W 30/18*    (2012.01)

(52) U.S. Cl.
CPC ...... *B60W 40/06* (2013.01); *B60W 30/18036* (2013.01); *B60W 2420/42* (2013.01); *B60W 2420/52* (2013.01); *B60W 2552/00* (2020.02)

(58) Field of Classification Search
CPC ..... B60W 30/18036; B60W 2370/173; B60W 40/06; B60W 2552/00; B60W 2552/20; B60W 2552/35; B60Q 1/02; B60Q 1/22; B60Q 1/24; B60Q 1/245; B60T 2230/08
See application file for complete search history.

(56) References Cited

U.S. PATENT DOCUMENTS

| | | | |
|---|---|---|---|
| 2014/0270392 A1* | 9/2014 | Kim ...................... | B60W 40/06 382/108 |
| 2016/0009177 A1* | 1/2016 | Brooks ................ | B65G 69/006 340/468 |
| 2016/0034771 A1* | 2/2016 | Schamp ............... | G06V 10/145 348/148 |
| 2017/0028902 A1* | 2/2017 | Diaz .................... | B60Q 1/0035 |
| 2017/0151904 A1* | 6/2017 | Youn ...................... | B60Q 1/50 |
| 2017/0259731 A1* | 9/2017 | Son ......................... | B60Q 1/30 |
| 2018/0043819 A1* | 2/2018 | Kim ...................... | B60Q 1/085 |
| 2018/0335774 A1* | 11/2018 | Sato ...................... | G05D 1/0248 |
| 2019/0210593 A1* | 7/2019 | Perez Barrera ......... | A47L 9/242 |
| 2020/0114812 A1* | 4/2020 | Imaishi .................. | B60Q 1/346 |

FOREIGN PATENT DOCUMENTS

KR   10178929 B1 *  3/2017  .......... B60G 17/019
KR   101718929 B1 *  3/2017

* cited by examiner

*Primary Examiner* — Russell Frejd
*Assistant Examiner* — Sara J Lewandroski
(74) *Attorney, Agent, or Firm* — Slater Matsil, LLP (57) ABSTRACT

Disclosed are an apparatus for controlling a reverse drive of a vehicle and a method of outputting warning thereof. The apparatus for controlling a reverse drive of a vehicle includes a sensor that senses whether a reverse shift is input, a lamp that outputs a reverse guide pattern to a ground surface, and a controller that controls the lamp to output the reverse guide pattern when the reverse shift is input and determine whether the vehicle is able to be reversed based on whether the reverse guide pattern output to the ground surface is changed.

16 Claims, 9 Drawing Sheets

APPARATUS FOR CONTROLLING REVERSE DRIVING OF VEHICLE AND METHOD OF OUTPUTTING WARNING THEREOF

CROSS-REFERENCE TO RELATED APPLICATIONS

This application claims priority to Korean Patent Application No. 10-2019-0072163, filed in the Korean Intellectual Property Office on Jun. 18, 2019, which application is hereby incorporated herein by reference.

TECHNICAL FIELD

The present disclosure relates to an apparatus for controlling a reverse drive of a vehicle and a method of outputting warning thereof.

BACKGROUND

An ultrasonic sensor is provided on a rear portion of a vehicle to provide a rearward state of the vehicle which cannot be recognized by the driver while the vehicle is reversed. The ultrasonic sensor measures the distance from the obstacle located at the rear of the vehicle to determine the location of the obstacle such that the vehicle may be prevented from colliding with the obstacle during reversing. However, although the ultrasonic sensor can easily detect an obstacle having a predetermined height from the ground surface, it is difficult to determine information about the ground surface itself so that it is difficult to provide the driver with information about the ground surface of the rear of the vehicle. As a result, there is an accident that the vehicle falls back or falls in a puddle due to reverse driving of the vehicle, such as clay or cliff, where it is impossible to reverse.

SUMMARY

Embodiments of the present disclosure can solve problems occurring in the prior art while advantages achieved by the prior art are maintained intact.

An aspect of the present disclosure provides an apparatus for controlling a reverse drive of a vehicle, which is capable of determining an area where a reverse drive of a vehicle is impossible, based on an image of a reverse guide pattern outputted to the ground surface during reverse driving of the vehicle, and a method of outputting warning thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a reverse drive of a vehicle includes a sensor that senses whether a reverse shift is input, a lamp that outputs a reverse guide pattern to a ground surface, and a controller that controls the lamp to output the reverse guide pattern when the reverse shift is input and determine whether the vehicle is able to be reversed based on whether the reverse guide pattern output to the ground surface is changed.

The apparatus may further include a camera that obtains an image of the reverse guide pattern output to the ground surface.

The controller may determine an illuminance of the reverse guide pattern output to the ground surface based on the image of the reverse guide pattern output to the ground surface.

The controller may determine that the reverse guide pattern output to the ground surface is changed when the illuminance of the reverse guide pattern output to the ground surface is less than a reference illuminance.

The controller may control to output warning when the number of patterns less than a reference illuminance among reverse guide patterns output to the ground surface exceeds a first reference number.

The controller may perform braking of the vehicle when the number of patterns less than a reference illuminance among reverse guide patterns output to the ground surface exceeds a second reference number.

The controller may determine a size of the reverse guide pattern output to the ground surface based on the image of the reverse guide pattern output to the ground surface.

The controller may determine that the reverse guide pattern output to the ground surface is changed when the size of the reverse guide pattern output to the ground surface exceeds a reference size.

The controller may determine that the reverse drive of the vehicle is impossible when determining that the reverse guide pattern output to the ground surface is changed.

According to another aspect of the present disclosure, a method of outputting warning of a reverse drive control apparatus for a vehicle includes sensing whether a reverse shift is input, outputting a reverse guide pattern to a ground surface when the reverse shift is input, and determining whether the vehicle is able to be reversed based on whether the reverse guide pattern output to the ground surface is changed.

The method may further include obtaining an image of the reverse guide pattern output to the ground surface.

The method may further include determining an illuminance of the reverse guide pattern output to the ground surface based on the image of the reverse guide pattern output to the ground surface.

The method may further include determining that the reverse guide pattern output to the ground surface is changed when the illuminance of the reverse guide pattern output to the ground surface is less than a reference illuminance.

The method may further include controlling to output warning when the number of patterns less than a reference illuminance among reverse guide patterns output to the ground surface exceeds a first reference number.

The method may further include performing braking of the vehicle when the number of patterns less than a reference illuminance among reverse guide patterns output to the ground surface exceeds a second reference number.

The method may further include determining a size of the reverse guide pattern output to the ground surface based on the image of the reverse guide pattern output to the ground surface.

The method may further include determining that the reverse guide pattern output to the ground surface is changed when the size of the reverse guide pattern output to the ground surface exceeds a reference size.

The method may further include determining that the reverse drive of the vehicle is impossible when determining that the reverse guide pattern output to the ground surface is changed.

BRIEF DESCRIPTION OF THE DRAWINGS

The above and other objects, features and advantages of the present disclosure will be more apparent from the following detailed description taken in conjunction with the accompanying drawings:

FIG. 2, which includes

FIG. 3, which includes

FIG. 4, which includes

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
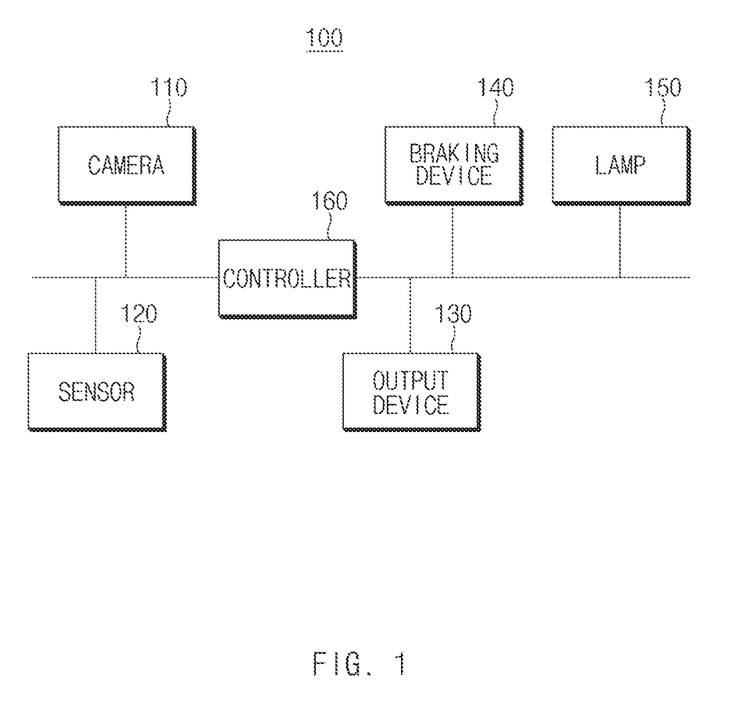
FIG. 1 is a block diagram illustrating an apparatus for controlling a reverse drive of a vehicle according to an embodiment of the present disclosure.

FIG. 1 is a block diagram illustrating an apparatus for controlling a reverse drive of a vehicle according to an embodiment of the present disclosure.

As shown in FIG. 1, an apparatus 100 for controlling a reverse drive of a vehicle according to an embodiment of the present disclosure may include a camera 110, a sensor 120, a display 130, a braking device 140, a lamp 150 and a controller 160.

The camera 110 may include a rear camera installed on a rear portion of the vehicle. The camera 110 may obtain a rear image by photographing the rear of the vehicle. To this end, a wide-angle lens or a fish-eye lens may be used. In addition, the camera 110 may obtain an image of a reverse drive guide pattern output to the ground surface.

The sensor 120 may sense the state of the vehicle or around the vehicle. In more detail, the sensor 120 may include an illuminance sensor, a distance sensor, a transmission sensor, and the like.

The illuminance sensor may sense the brightness of the surroundings of the vehicle, convert it into an electrical signal, and transmit the converted signal to the controller 160. The distance sensor may be implemented with a radar, a lidar, a vision, an infrared sensor, or an ultrasonic sensor, and may detect the location of the obstacle around the vehicle to determine the distance to the obstacle. In addition, the transmission sensor may sense the input state of the transmission.

The output device 130 may include a display and a sound output device. The display may display an image obtained through the camera 110, and may display a warning image. The display may include a cluster, AVN, and the like. The display may be implemented as a display employing a liquid crystal display (LCD) panel, a light emitting diode (LED) panel, an organic light emitting diode (OLED) panel, or a plasma display panel (PDP), or the like. The liquid crystal display may include a thin film transistor liquid crystal display (TF-LCD). The sound output device may output a warning message as a sound, and may be implemented with a speaker.

The braking device 140 may brake the vehicle under control of the controller 160. According to an embodiment, the braking device 140 may include a disc brake, a caliper, and the like, and generate a frictional force to the vehicle, thereby braking the vehicle.

A lamp 150 may output light to the rear of the vehicle to support the reverse drive when the reverse shift is input under the control of the controller 160, and may output a reverse guide pattern to the ground surface by output light.

The controller 160 may be implemented by a processing unit such as a microprocessor having a semiconductor chip or the like that can compute or execute various kinds of commands. The operation of the control device can be controlled.

According to an embodiment of the present disclosure, the controller 160 may output the reverse guide pattern to the ground surface when the reverse shift is input, and determine whether the vehicle is able to be reversed based on whether the reverse guide pattern output to the ground surface changes.

In detail, the controller 160 may determine the illuminance around the vehicle based on the information obtained from the illuminance sensor. The controller 160 may determine that it is night when the illuminance around the vehicle is lower than a preset illuminance, and may determine that it is not night when the illuminance around the vehicle is higher than the preset illuminance.

The controller 160 determines the input state of the transmission based on the information obtained from the transmission sensor when it is determined to be night because the illuminance around the vehicle is lower than the preset illuminance. When the input state of the transmission is in the reverse state, the controller 160 may determine whether an obstacle is detected in the rear of the vehicle by using the distance sensor. When it is determined that an obstacle has been detected in the rear of the vehicle, the controller 160 may warn through the output device 130 that the vehicle may collide with the obstacle during rearward driving of the vehicle.

When it is determined that no obstacle is detected behind the vehicle, the controller 160 may control the lamp 150 to output the reverse guide pattern onto the ground surface, where the reverse guide pattern includes at least one pattern which extends from one rear side and an opposite side of the rear of the vehicle to the rear of the vehicle. In this case, the at least one pattern may have various shapes such as a circle, a rectangle, a triangle, and the like. The more details will be described with reference to FIGS. 2A and 2B, collectively FIG. 2.

Figure 2A:
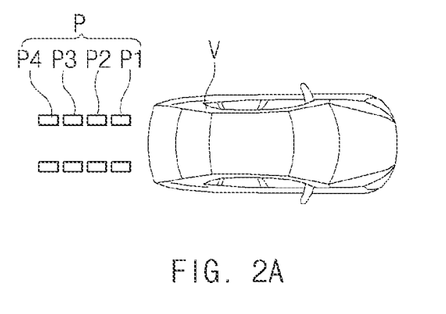
FIGS. 2A and 2B, is a view schematically illustrating a reverse guide pattern output in a state in which it is possible to reverse the vehicle.
Figure 2B:
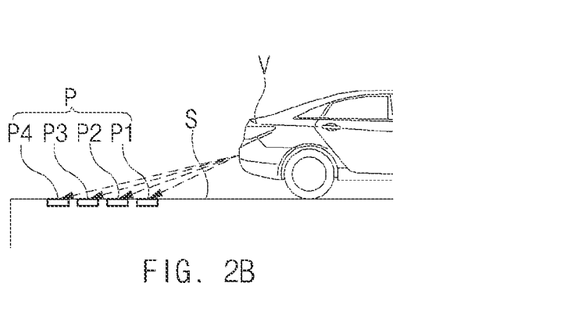

The controller 160 obtains, from the camera 110, an image of the reverse guide pattern output to the ground surface of the rear of the vehicle and compares the illuminance of at least one among the reverse guide patterns output to the ground surface with a reference illuminance based on the obtained image to determine whether there is a pattern of which the illuminance is lower than the reference illuminance. In the present disclosure, the controller 160 may determine whether the illuminance of the pattern is lower than the reference illuminance by using the characteristic that the illuminance of the pattern is lowered away from the light source, thereby determining the ground surface state. In this case, the reference illuminance may be set to the illuminance of the pattern (e.g., P4 of FIG. 2) output at the farthest location from the vehicle when the reverse guide pattern is output onto a flat ground surface (steady state).

According to an embodiment of the present disclosure, when it is determined that the illuminance of the pattern is less than the reference illuminance, the controller 160 may determine that the reverse guide pattern is not output to the ground surface, but a ground surface which is non-continuous due to a vertical inclined surface such as a cliff where the height of the ground surface suddenly changes, or output to a ground surface which is uneven like a mud pool.

In addition, when it is determined that the illuminance of the reverse guide pattern output to the ground surface based on the image obtained from the camera 110 is less than the reference illuminance, the controller 160 may determine that the reverse guide pattern output to the ground surface is changed. When it is determined that the reverse guide pattern output to the ground surface is changed by using the image obtained from the camera 110, the controller 160 may determine that it is impossible to reverse the vehicle.

In addition, the controller 160 compares the size of the reverse guide pattern outputted to the ground surface with the reference size based on the image obtained from the camera 110, and determines whether there is a reverse guide pattern output to the ground surface that has a size exceeding the reference size. In the present disclosure, the controller 160 may determine whether the size of at least one of the reverse guide patterns output to the ground surface exceeds the reference size by using the characteristic that the pattern size increases as the distance from the light source increases, and thus, may determine the ground surface state. In this case, the reference size may be set to the size of the pattern (e.g., P4 of FIG. 2) output at the farthest location from the vehicle when the reverse guide pattern is output to a flat ground surface (steady state).

According to an embodiment of the present disclosure, when it is determined that the size of at least one of the reverse guide patterns outputted to the ground surface exceeds the reference size, the controller 160 may determine that the reverse guide pattern is output to a ground surface which is non-continuous due to a vertical inclined surface such as a cliff where the height of the ground surface suddenly changes.

When the size of the reverse guide pattern exceeds the reference size by using the rear image obtained from the camera 110, the controller 160 determines that the reverse guide pattern output to the ground surface is changed. When the controller 160 determines that the reverse guide pattern is changed based on the image obtained from the camera 110, the controller 160 may determine that it is impossible to reverse the vehicle.

When the controller 160 determines that it is impossible to reverse the vehicle, the controller 160 may warn the driver of it. According to an embodiment, when the number of patterns that have sizes exceeding the reference size exceeds a first reference number, the controller 160 may output a warning message or sound that informs, through the output device 130, the driver that it is impossible to reverse the vehicle. In addition, when the number of patterns whose pattern size exceeds the reference size exceeds the second reference number, the controller 160 may not only output a warning message or sound to inform the driver that it is impossible to reverse the vehicle through the output device 130, but also control the braking device 140 of the vehicle to brake the vehicle.

FIG. 2 is a view schematically illustrating a reverse guide pattern output in a state in which it is possible to reverse the vehicle.

FIG. 2A is a plan view of the reverse guide pattern, and FIG. 2B is a sectional view of the reverse guide pattern.

As shown in FIG. 2A, when it is determined that any obstacles are not detected behind the vehicle V, the controller 160 may control the lamp 150 to output light to the ground surface, thereby outputting the reverse guide pattern P to the ground surface. According to an embodiment of the present disclosure, the reverse guide pattern P may include at least one pattern extending from one side and an opposite side of the rear of the vehicle to the rear of the vehicle. In this case, the shape of the at least one pattern may include various shapes such as a circle, a rectangle, a triangle, and the like.

As shown in FIG. 2, the controller 160 may determine that the illuminance of patterns P1 to P4 are equal to or greater than the reference illuminance and the sizes of the patterns P1 to P4 are equal to or smaller than the reference size, based on the image of the reverse guide pattern P obtained from the camera 110. Accordingly, the controller 160 may determine that there is no change in the reverse guide pattern P output to the ground surface S to support the reverse drive. As described above, when it is determined that there is no change in the reverse guide pattern P, the controller 160 may determine that the vehicle is able to drive in reverse.

Figure 3A:
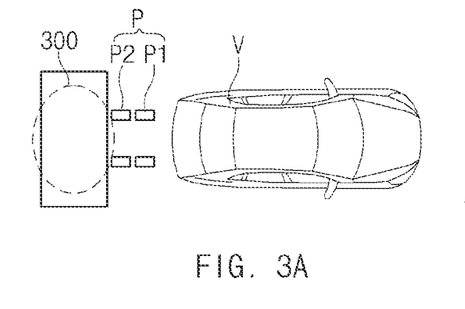
FIGS. 3A and 3B, is a view schematically illustrating a reverse guide pattern according to a first embodiment, which is outputted when it is impossible to reverse the vehicle.
Figure 3B:
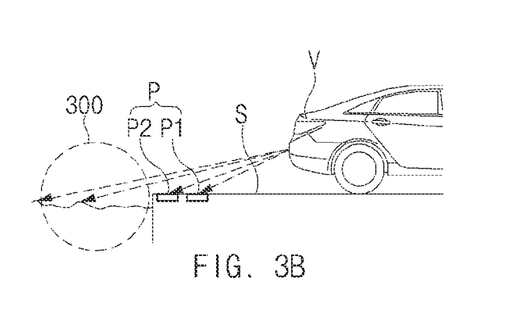

FIG. 3 is a view schematically illustrating a reverse guide pattern according to a first embodiment, which is outputted when it is impossible to reverse the vehicle.

FIG. 3A is a plan view illustrating the reverse guide pattern, and of FIG. 3B is a sectional view illustrating the reverse guide pattern.

As shown in FIG. 3, when it is determined that any obstacles are not detected behind the vehicle V, the controller 160 may control the lamp 150 to output light to the ground surface S, thereby outputting the reverse guide pattern P to the ground surface. In this case, when the ground surface S is non-continuous due to a vertical inclined surface where the height of the ground surface S suddenly changes and a water surface 300 exists at the end of the ground surface, the controller 160 may determine that the illuminance of the reverse guide pattern output to the water surface 300 is less than the reference illuminance based on the image obtained from the camera 110. In addition, the controller 160 may determine that the size of the reverse guide pattern output to the water surface 300 exceeds the reference size, based on the image acquired from the camera 110. Accordingly, the controller 160 may determine that the reverse guide pattern output to the ground surface is changed. In this case, the controller 160 may determine that it is impossible to reverse the vehicle.

Figure 4A:
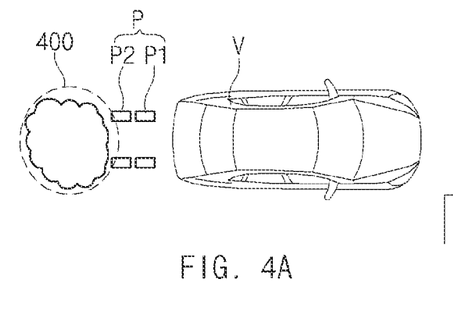
FIGS. 4A and 4B, is a view schematically illustrating a reverse guide pattern output in a state in which it is possible to reverse the vehicle.
Figure 4B:
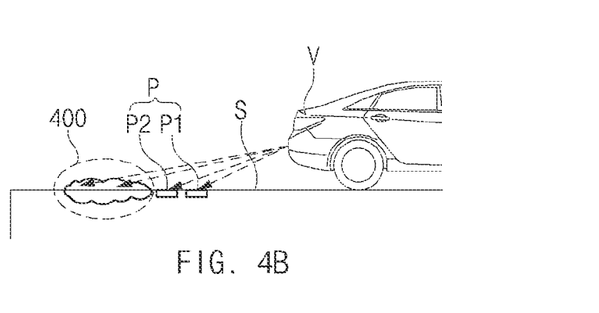

FIG. 4 is a view schematically illustrating a reverse guide pattern output in a state in which it is impossible to reverse the vehicle.

FIG. 4A is a plan view of the reverse guide pattern, and FIG. 4B is a sectional view of the reverse guide pattern.

As shown in FIG. 4, when it is determined that any obstacles are not detected behind the vehicle V, the controller 160 may output light to the ground surface S to output the reverse guide pattern P to the ground surface. In this case, when there is a ground surface 400 having a rough surface such as a mud pool, the controller 160 may determine that the illuminance of the reverse guide pattern output to the rugged ground surface 400 is less than the reference illuminance, based on the image obtained from the camera 110. In addition, the controller 160 may determine that the size of the reverse guide pattern output to the rugged ground surface 400 exceeds the reference size, based on the image obtained from the camera 10. Accordingly, the controller 160 may determine that the reverse guide pattern has changed. In this case, the controller 160 may determine that the backward travel of the vehicle is impossible.

Figure 5:
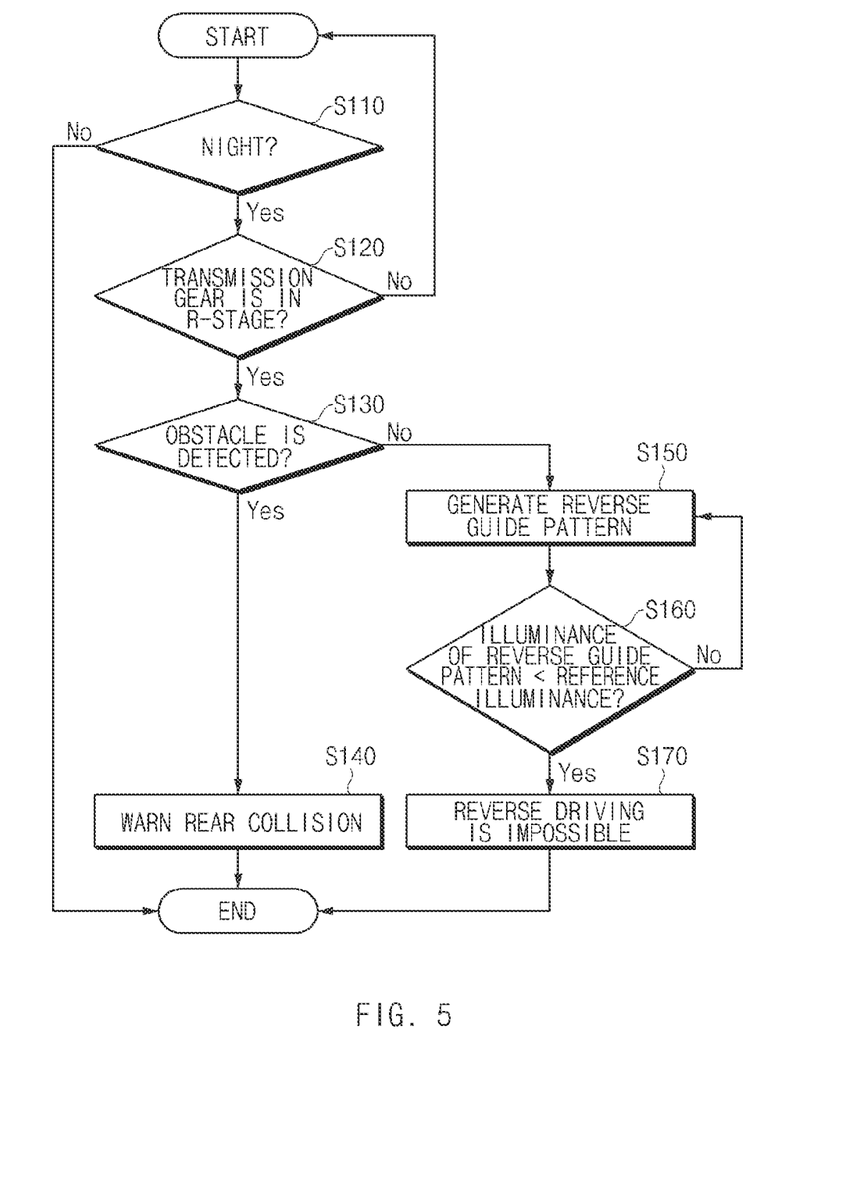
FIG. 5 is a flowchart illustrating a method of determining whether it is impossible to reverse a vehicle according to an embodiment of the present disclosure.

FIG. 5 is a flowchart illustrating a method of determining whether it is impossible to reverse a vehicle according to an embodiment of the present disclosure.

As shown in FIG. 5, in operation S110, the controller 160 detects the illuminance around the vehicle based on the information obtained from the illuminance sensor to determine whether it is night. When it is determined that the illuminance around the vehicle is lower than the preset illuminance in operation S110, the controller 160 may determine that it is night, and when it is determined that the illuminance around the vehicle is higher than the preset illuminance in operation S110, the controller 160 may determine that it is not night. When it is determined in operation S110 that it is not night (N), the operation is terminated.

When the controller 160 determines in operation S110 that it is night (Y), the controller 160 determines whether the input state of the transmission is in the reverse state based on the information obtained from the transmission sensor in operation S120. When it is determined in operation S120 that the input state of the transmission is in the reverse state (Y), the controller 160 determines whether an obstacle is detected in the rear of the vehicle based on the information obtained from the distance sensor in operation S130. When the controller 160 determines in operation S120 that the transmission is not in the input state (N), the process returns to the initial operation.

When it is determined in operation S130 that the obstacle is detected in the rear of the vehicle (Y), the controller 160 warns through the output device 130 that the vehicle may collide with the obstacle in the reversing of the vehicle in operation S140. When it is determined in operation S130 that the obstacle is not detected in the rear of the vehicle (N), in operation S150, the controller 160 outputs the reverse guide pattern supporting the reverse driving to the ground surface.

In operation S150, the controller 160 may control the lamp 150 to output light to the ground surface, so that the reverse guide pattern is output to the ground surface. The reverse guide pattern may include at least one pattern extending from one side and an opposite side of the rear of the vehicle to the rear of the vehicle. In this case, the shape of the at least one pattern may include various shapes such as a circle, a rectangle, a triangle, and the like. The more details refer to the description of FIG. 2.

In operation S160, the controller 160 obtains an image from the camera 110 in a state where the reverse guide pattern is output to the ground surface behind the vehicle, and compares the illuminance of each of the at least one reverse guide pattern in the image with the reference illuminance to determine whether there is a pattern whose illuminance is less than the reference illuminance. In operation S160, the controller 160 may determine whether the illuminance of the pattern is less than the reference illuminance using the characteristic that the illuminance of the pattern is lowered away from the light source, and determine the ground surface state accordingly.

According to an embodiment of the present disclosure, when it is determined that the illuminance of the pattern is less than the reference illuminance, the controller 160 may determine that the reverse guide pattern is output to the ground surface which is non-continuous due to a vertical inclined surface such as a cliff where the height of the ground surface suddenly changes, or output to the ground surface which is uneven like a mud pool.

When it is determined in operation S160 that the illuminance of at least one reverse guide pattern is less than the reference illuminance by using the image obtained from the camera 110 (Y), in operation S170, the controller 160 determines that the reverse guide pattern is changed and it is impossible to reverse the vehicle. When it is determined in operation S160 that the illuminance of at least one reverse guide pattern is equal to or higher than the reference illuminance, the controller 160 performs operation S150.

Figure 6:
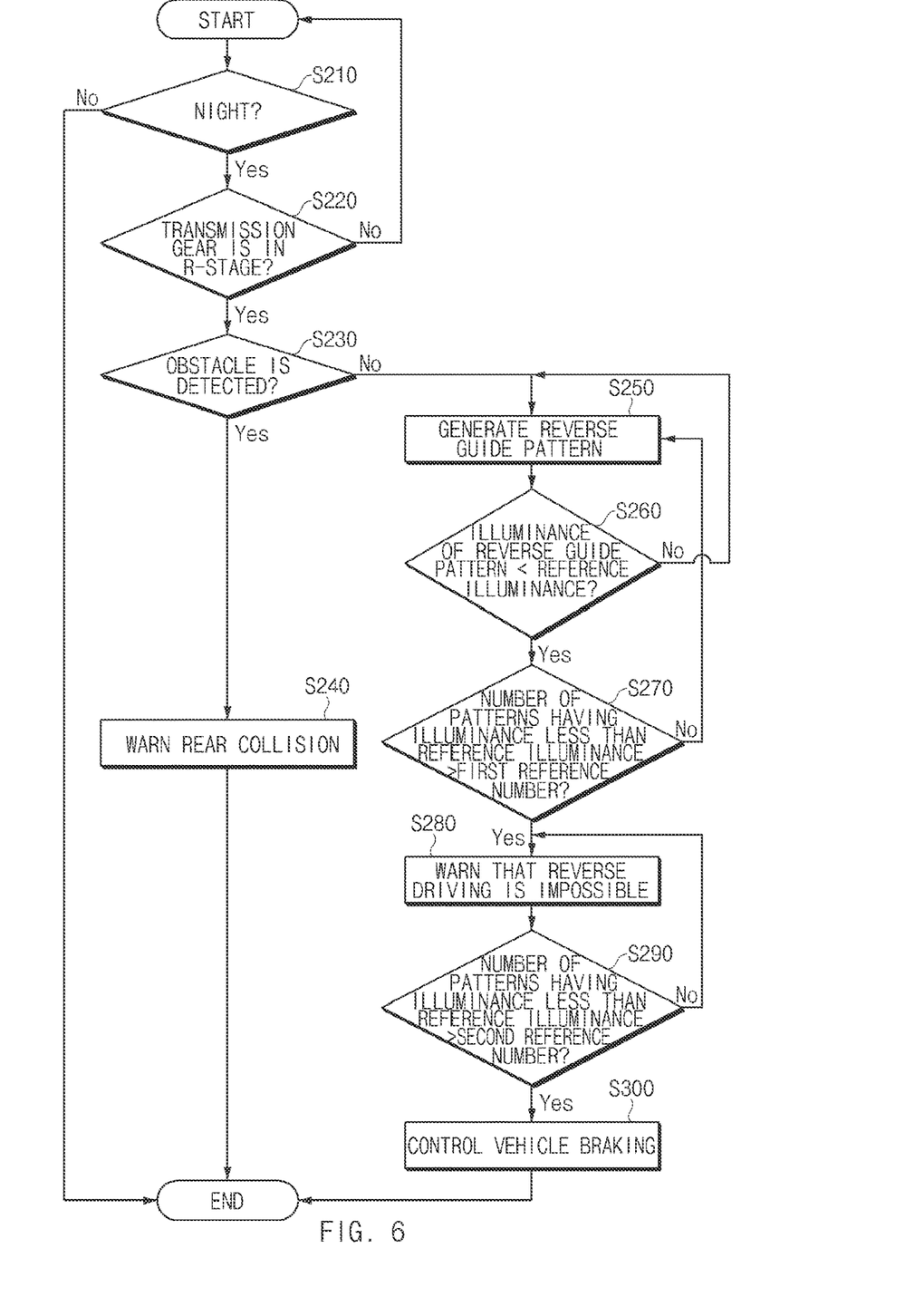
FIG. 6 is a flowchart illustrating a method of controlling reverse driving of a vehicle according to an embodiment of the present disclosure.

FIG. 6 is a flowchart illustrating a method of controlling reverse driving of a vehicle according to an embodiment of the present disclosure As shown in FIG. 6, in operation S210, the controller 160 detects the illuminance around the vehicle based on the information obtained from the illuminance sensor to determine whether it is night.

When the controller 160 determines in operation S210 that it is night (Y), the controller 160 determines whether the input state of the transmission is in the reverse state based on the information obtained from the transmission sensor in operation S220. When it is determined in operation S220 that the input state of the transmission is in the reverse state (Y), the controller 160 determines whether an obstacle is detected in the rear of the vehicle based on the information obtained from the distance sensor in operation S230. When the controller 160 determines in operation S220 that the transmission is not in the input state (N), the process returns to the initial operation.

When it is determined in operation S230 that the obstacle is detected in the rear of the vehicle (Y), the controller 160 warns through the output device 130 that the vehicle may collide with the obstacle in the reversing of the vehicle in operation S240. When it is determined in operation S230 that the obstacle is not detected in the rear of the vehicle (N), in operation S250, the controller 160 outputs the reverse guide pattern supporting the reverse driving. In operation S250, the controller 160 may control the lamp 150 to output light to the ground surface, such that the reverse guide pattern is output to the ground surface on which the vehicle is able to travel.

In operation S260, the controller 160 obtains a rear image from the camera 110 in a state where the reverse guide pattern is output to the ground surface behind the vehicle, and compares the illuminance of each of the at least one reverse guide pattern in the image with the reference illuminance to determine whether there is a pattern whose illuminance is less than the reference illuminance.

When it is determined in operation S260 that there is a pattern of which the illuminance is lower than the reference illuminance, the controller 160 determines whether the number of patterns below the reference illuminance exceeds the first reference number in operation S270. When it is determined in S260 that there is a pattern having the illuminance that equal to or higher than the reference illuminance (N), the controller 160 performs operation S250.

When it is determined that the number of patterns having the illuminances less than the reference illuminance exceeds the first reference value (Y) in operation S270, the controller 160 outputs a warning message or sound to inform that it is impossible to reverse the vehicle. When it is determined in operation S270 that the number of patterns whose illuminance less than the reference illuminance is equal to or less than the first reference number (N), the controller 160 performs operation S250.

In addition, the controller 160 determines whether the number of patterns whose illuminance is less than the reference illuminance exceeds the second reference number in operation S290. When it is determined in operation S290 that the number of patterns whose illuminance is less than the reference illuminance exceeds the second reference number (Y), the controller 160 controls the braking device 140 of the vehicle to brake the vehicle in operation S300. The controller 160 performs operation S280 when it is determined in operation S290 that the number of patterns whose illuminance is less than the reference illuminance is equal to or less than the second reference number.

Figure 7:
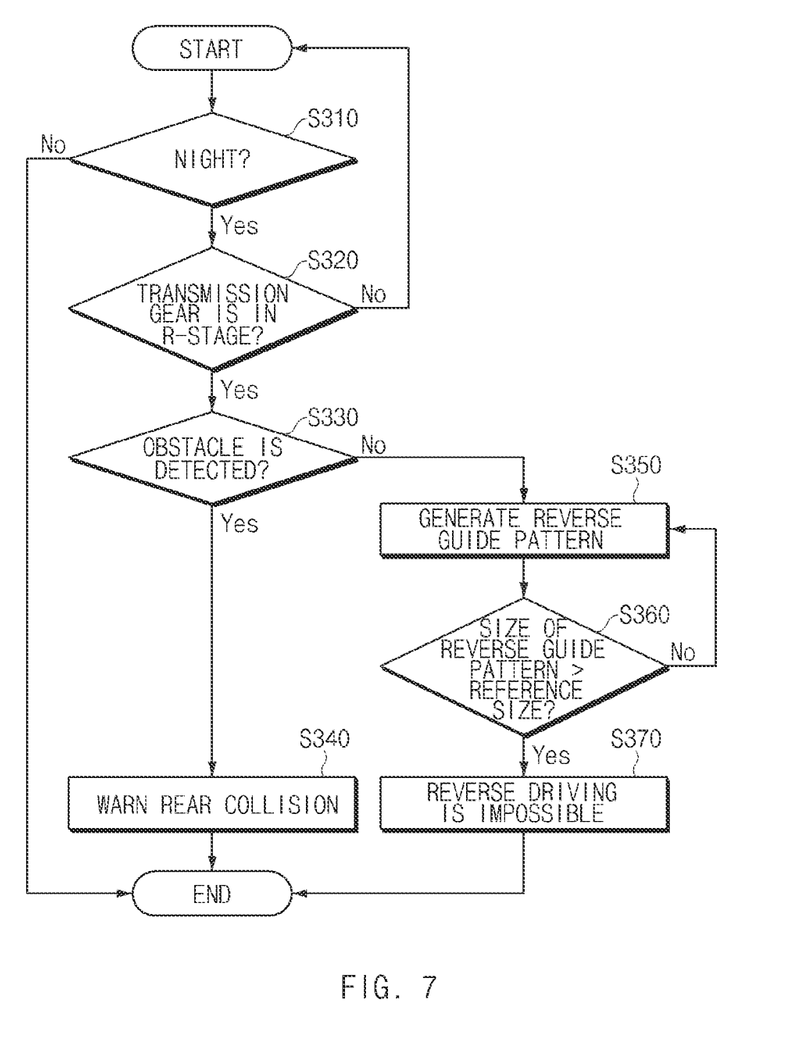
FIG. 7 is a flowchart illustrating a method of determining whether it is impossible to reverse a vehicle according to another embodiment of the present disclosure.

FIG. 7 is a flowchart illustrating a method of determining whether it is impossible to reverse a vehicle according to another embodiment of the present disclosure.

As shown in FIG. 7, in operation S310, the controller 160 detects the illuminance around the vehicle based on the information obtained from the illuminance sensor to determine whether it is night. In operation S310, when the illuminance around the vehicle is lower than the preset illuminance, the controller 160 may determine that it is night, and when the illuminance around the vehicle is higher than the preset illuminance, the controller 160 may determine that it is not night. When it is determined in operation S310 that it is not night (N), the operation is terminated.

When the controller 160 determines in operation S310 that it is night (Y), the controller 160 determines whether the input state of the transmission is in the reverse state based on the information obtained from the transmission sensor in operation S320. When it is determined in operation S320 that the input state of the transmission is in the reverse state (Y), the controller 160 determines whether an obstacle is detected in the rear of the vehicle based on the information obtained from the distance sensor in operation S330. When the controller 160 determines in operation S320 that the transmission is not in the input state (N), the process returns to the initial operation.

When it is determined in operation S330 that the obstacle is detected in the rear of the vehicle (Y), the controller 160 warns through the output device 130 that the vehicle may collide with the obstacle in the reversing of the vehicle in operation S340. When it is determined in operation S330 that the obstacle is not detected in the rear of the vehicle (N), in operation S350, the controller 160 outputs the reverse guide pattern supporting the reverse driving.

In operation S350, the controller 160 may control the lamp 150 to output light to the ground surface, so that the reverse guide pattern is output to the ground surface.

In operation S360, the controller 160 obtains a rear image from the camera 110 in a state where the reverse guide pattern is output to the ground surface behind the vehicle, and compares the size of each of the at least one reverse guide pattern in the rear image with the reference size to determine whether there is a pattern whose the size is not less than the reference size. In operation S360, the controller 160 may determine whether the size of the pattern is not less than the reference size by using the characteristic that the size of the pattern increases as the distance from the light source increases, and determine the ground surface state accordingly. According to an embodiment of the present disclosure, when the controller 160 determines that the illuminance of the pattern is not less than the reference illuminance, the controller 160 may determine that the reverse guide pattern is output to the ground surface which is non-continuous due to a vertical inclined surface such as a cliff where the height of the ground surface suddenly changes, or output to the ground surface which is uneven like a mud pool.

When it is determined in operation S360 that the size of at least one reverse guide pattern exceeds the reference size by using the rear image obtained from the camera 110 (Y), in operation S370, the controller 160 determines that the reverse guide pattern is changed and it is impossible to reverse the vehicle. When it is determined in operation S360 that the size of at least one reverse guide pattern is equal to or smaller than the reference size (N), the controller 160 performs operation S350.

Figure 8:
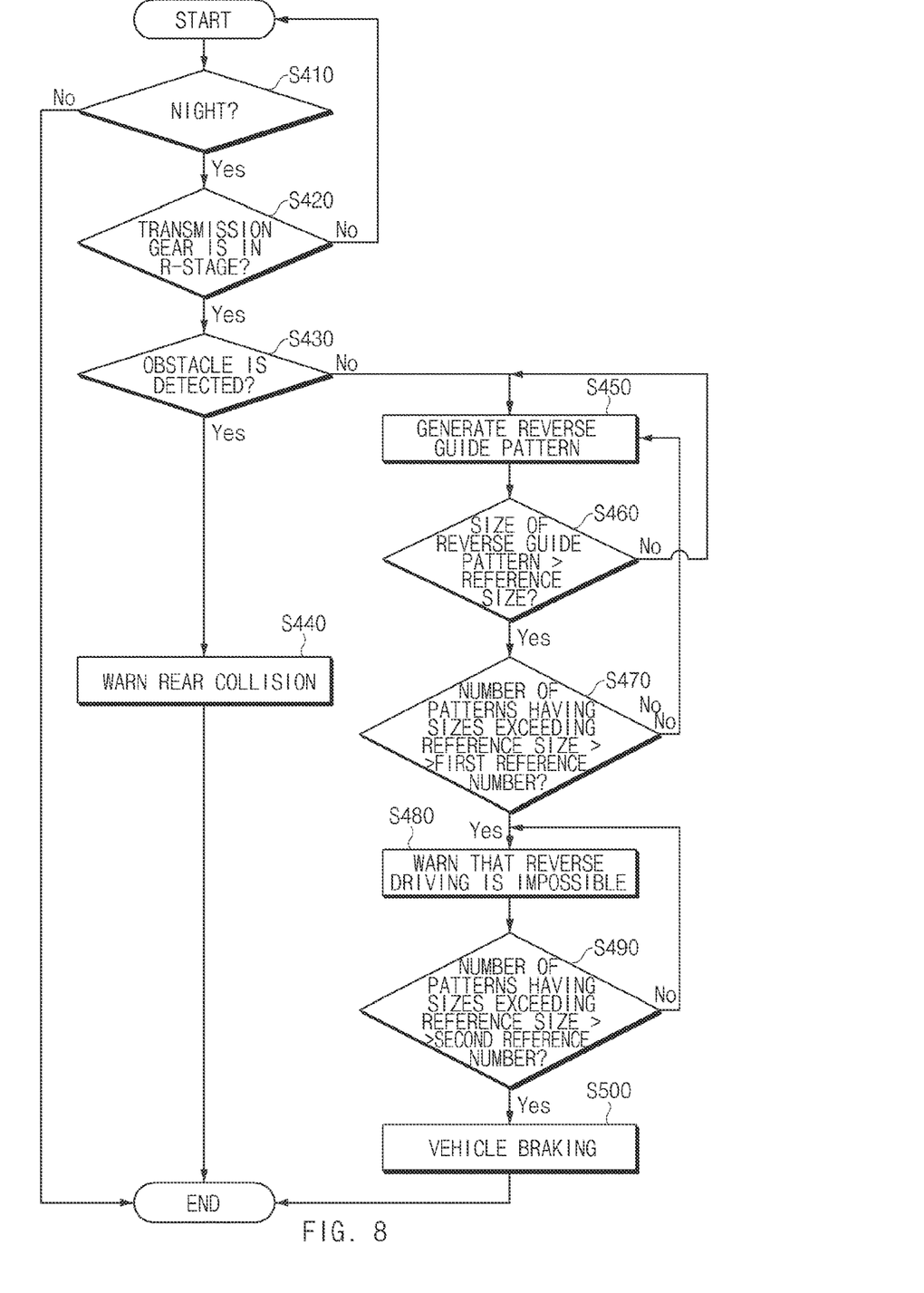
FIG. 8 is a flowchart illustrating a method of controlling reverse driving of a vehicle according to another embodiment of the present disclosure.

FIG. 8 is a flowchart illustrating a method of controlling reverse driving of a vehicle according to another embodiment of the present disclosure.

As shown in FIG. 8, in operation S410, the controller 160 detects the illuminance around the vehicle based on the information obtained from the illuminance sensor to determine whether it is night.

When the controller 160 determines in operation S410 that it is night (Y), the controller 160 determines whether the input state of the transmission is in the reverse state based on the information obtained from the transmission sensor in operation S420. When it is determined in operation S420 that the input state of the transmission is in the reverse state (Y), the controller 160 determines whether an obstacle is detected in the rear of the vehicle based on the information obtained from the distance sensor in operation S430. When the controller 160 determines in operation S420 that the transmission is not in the input state (N), the process returns to the initial operation.

When it is determined in operation S430 that the obstacle is detected in the rear of the vehicle (Y), the controller 160 warns through the output device 130 that the vehicle may collide with the obstacle in the reversing of the vehicle in operation S440. When it is determined in operation S430 that the obstacle is not detected in the rear of the vehicle (N), in operation S450, the controller 160 outputs the reverse guide pattern supporting the reverse driving.

In operation S450, the controller 160 may control the lamp 150 to output light to the ground surface, such that the reverse guide pattern is output to the ground surface.

In operation S460, the controller 160 obtains a rear image from the camera 110 in a state where the reverse guide pattern is output to the ground surface behind the vehicle, and compares the size of each of the at least one reverse guide pattern in the rear image with the reference size to determine whether there is a pattern whose the size exceeds the reference size.

When it is determined in operation S460 that there is a pattern of which the size exceeds the reference size, the controller 160 determines whether the number of patterns of which the sizes exceed the reference size exceeds the second reference number in operation S470. When it is determined in S460 that there is a pattern of which the size is equal to or smaller than the reference size (N), the controller 160 performs operation S450.

When the controller 160 determines that the number of patterns of which the sizes exceed the reference size exceeds the first reference number (Y) in operation S470, in operation S480, the controller 160 outputs a warning message or sound to inform that it is impossible to reverse the vehicle. When it is determined in operation S470 that the number of patterns whose the sizes exceed the reference size is equal to or less than the first reference number (N), the controller 160 performs operation S450.

In addition, the controller 160 determines whether the number of patterns whose the sizes exceed the reference size exceeds the second reference number in operation S490. When it is determined in operation S490 that the number of patterns whose the sizes exceed the reference size exceeds the second reference number (Y), the controller 160 controls the braking device 140 of the vehicle to brake the vehicle in operation S500. The controller 160 performs operation S480 when it is determined in operation S490 that the number of patterns whose the sizes exceed the reference size is equal to or less than the second reference number.

Figure 9:
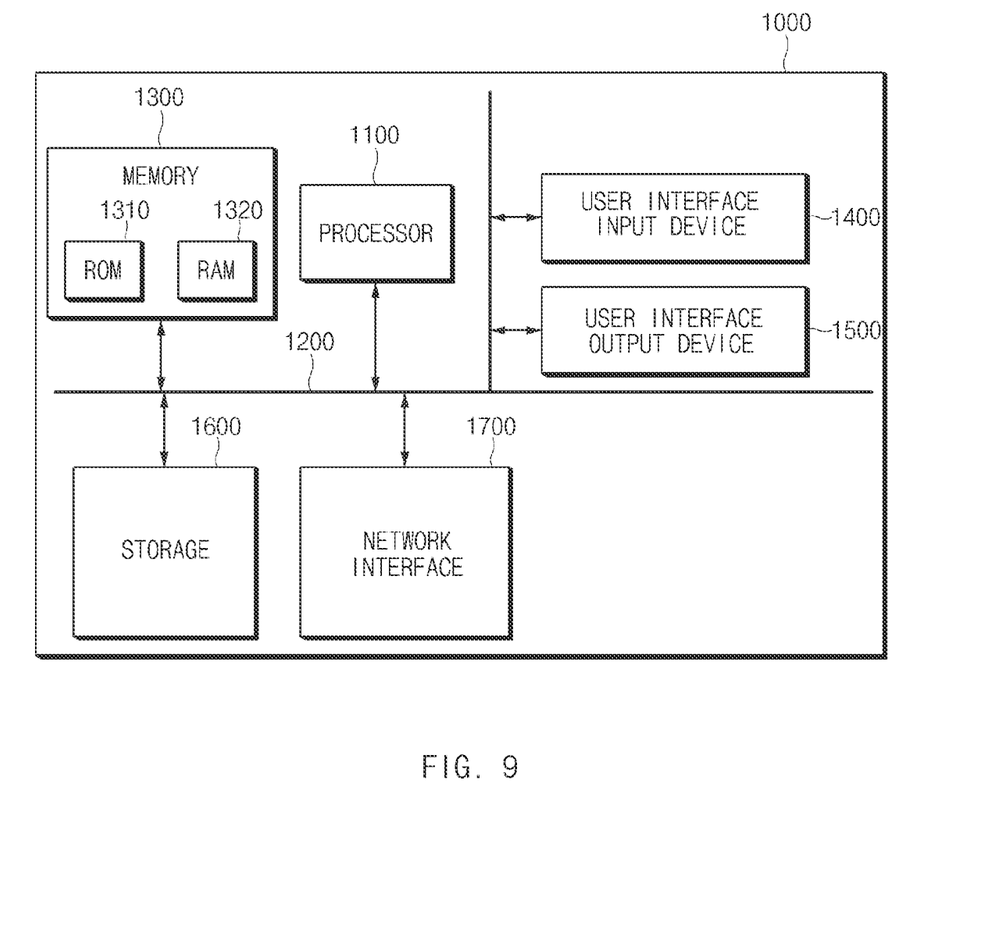
FIG. 9 is a block diagram illustrating a computing system for executing a method according to an embodiment of the present disclosure.

FIG. 9 is a block diagram illustrating a computing system for executing a method according to an embodiment of the present disclosure.

Referring to FIG. 9, a computing system 1000 may include a processor 1100 (i.e., a single processor or a plurality of processors working together), a memory 1300, a user interface input device 1400, a user interface output device 1500, storage 1600, and a network interface 1700, which are connected with each other via a bus 1200.

The processor 1100 may be a central processor (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

According to the apparatus for controlling a reverse drive of a vehicle and the method thereof according to an embodiment of the present disclosure, it is possible to determine an area where a reverse drive of a vehicle is impossible by using the image of a reverse guide pattern outputted to the ground surface during reverse driving of the vehicle, so that it is possible to support safe reverse driving to a driver and to reduce the cost because no additional device is required for this.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a reverse drive of a vehicle, the apparatus comprising:
    a sensor configured to sense whether a reverse shift is input;
    a lamp configured to output a plurality of reverse guide patterns to a ground surface; and
    a controller configured to:
        control the lamp to output the reverse guide patterns when the reverse shift is input, and
        control to output a warning when a number of the reverse guide patterns with illuminances less than a reference illuminance exceeds a first reference number,
    wherein the illuminances are illuminances of reverse guide pattern outputs to the ground surface, and
    wherein the first reference number is at least one.

2. The apparatus of claim 1, further comprising a camera configured to obtain an image of a reverse guide pattern output to the ground surface.

3. The apparatus of claim 2, wherein the controller is configured to determine an illuminance of the reverse guide pattern output to the ground surface based on the image of the reverse guide pattern output to the ground surface.

4. The apparatus of claim 3, wherein the controller is configured to determine that the reverse guide pattern output to the ground surface is changed when the illuminance of the reverse guide pattern output to the ground surface is less than the reference illuminance.

5. The apparatus of claim 1, wherein the controller is configured to determine that the reverse drive of the vehicle is impossible when determining that a reverse guide pattern output to the ground surface is changed.

6. The apparatus of claim 1, wherein the controller is configured to perform braking of the vehicle when the number of the reverse guide patterns with the illuminances less than the reference illuminance exceeds a second reference number.

7. The apparatus of claim 1, wherein the controller is configured to determine a size of the reverse guide pattern output to the ground surface based on an image of the reverse guide pattern output to the ground surface.

8. The apparatus of claim 7, wherein the controller is configured to determine that the reverse guide pattern output to the ground surface is changed when the size of the reverse guide pattern output to the ground surface exceeds a reference size.

9. A method for outputting a warning of a reverse drive control apparatus for a vehicle, the method comprising:
sensing whether a reverse shift is input;
outputting a plurality of reverse guide patterns to a ground surface when the reverse shift is input; and
controlling to output the warning when a number of the reverse guide patterns with illuminances less than a reference illuminance exceeds a first reference number,
wherein the illuminances are illuminances of reverse guide pattern outputs to the ground surface, and
wherein the first reference number is at least one.

10. The method of claim 9, further comprising determining that a reverse drive of the vehicle is impossible when determining that a reverse guide pattern output to the ground surface is changed.

11. The method of claim 9, further comprising obtaining an image of a reverse guide pattern output to the ground surface.

12. The method of claim 11, further comprising determining an illuminance of the reverse guide pattern output to the ground surface based on the image of the reverse guide pattern output to the ground surface.

13. The method of claim 12, further comprising determining that the reverse guide pattern output to the ground surface is changed when the illuminance of the reverse guide pattern output to the ground surface is less than the reference illuminance.

14. The method of claim 9, further comprising performing braking of the vehicle when the number of the reverse guide patterns with the illuminances less than the reference illuminance exceeds a second reference number.

15. The method of claim 9, further comprising determining a size of the reverse guide pattern output to the ground surface based on an image of the reverse guide pattern output to the ground surface.

16. The method of claim 15, further comprising determining that the reverse guide pattern output to the ground surface is changed when the size of the reverse guide pattern output to the ground surface exceeds a reference size.

* * * * *